(12) United States Patent
Krammer et al.

(10) Patent No.: US 11,318,956 B2
(45) Date of Patent: May 3, 2022

(54) ASSISTANCE SYSTEM AND METHOD FOR ASSISTING THE DRIVER OF A MOTOR VEHICLE WHEN POSITIONING THE MOTOR VEHICLE AT A PREDEFINED TARGET POSITION

(71) Applicant: Bayerische Motoren Werke Aktiengesellschaft, Munich (DE)

(72) Inventors: Josef Krammer, Holzkirchen (DE); Dirk Ahrens, Munich (DE); Jochen Otzelberger, Unterschleissheim (DE); Reiner Friedrich, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 172 days.

(21) Appl. No.: 16/104,301

(22) Filed: Aug. 17, 2018

(65) Prior Publication Data

US 2018/0354528 A1    Dec. 13, 2018

Related U.S. Application Data

(63) Continuation of application No. PCT/EP2017/051555, filed on Jan. 25, 2017.

(30) Foreign Application Priority Data

Feb. 17, 2016 (DE) ..................... 10 2016 202 460.4

(51) Int. Cl.
*B60W 50/12* (2012.01)
*B62D 15/02* (2006.01)
(Continued)

(52) U.S. Cl.
CPC ............. *B60W 50/12* (2013.01); *B60L 53/38* (2019.02); *B60W 10/04* (2013.01); *B60W 10/18* (2013.01);
(Continued)

(58) Field of Classification Search
CPC ...... B60W 50/12; B60W 30/06; B60W 10/04; B60W 10/18; B60W 10/20;
(Continued)

(56) References Cited

U.S. PATENT DOCUMENTS

| 8,169,340 B2 * | 5/2012 | Oyobe | B60L 15/007 340/932.2 |
| 2007/0051547 A1 * | 3/2007 | Fischer | B62D 15/028 180/204 |

(Continued)

FOREIGN PATENT DOCUMENTS

| CN | 102791517 A | 11/2012 |
| CN | 103492219 A | 1/2014 |

(Continued)

OTHER PUBLICATIONS

International Search Report (PCT/ISA/210) issued in PCT Application No. PCT/EP2017/051555 dated Apr. 25, 2017 with English translation (seven pages).

(Continued)

*Primary Examiner* — Aaron L Troost
(74) *Attorney, Agent, or Firm* — Crowell & Moring LLP

(57) ABSTRACT

An assistance system for assisting the driver of a motor vehicle when positioning the motor vehicle at a predefined target position is provided. The target position is preferably a charging position for wireless, in particular inductive, charging of the motor vehicle. In order to position the motor vehicle, the longitudinal movement of the vehicle can be controlled manually by one or more operator control elements (e.g., accelerator pedal, brake pedal) which can be actuated by the driver. The assistance system assists the manual longitudinal control during positioning. The assistance system serves to influence the manual longitudinal control. By influencing the manual longitudinal control, the assistance system counteracts, as a function of the respective (Continued)

position information, the longitudinal movement of the vehicle at least for certain relative positions, in order to bring the vehicle to a stop essentially at the target position.

6 Claims, 6 Drawing Sheets

(51) Int. Cl.
*B60W 30/06* (2006.01)
*B60L 53/38* (2019.01)
*B60W 10/04* (2006.01)
*B60W 10/18* (2012.01)
*B60W 10/20* (2006.01)

(52) U.S. Cl.
CPC ............ *B60W 10/20* (2013.01); *B60W 30/06* (2013.01); *B62D 15/0285* (2013.01); *B60W 2540/10* (2013.01); *B60W 2540/12* (2013.01); *B60W 2540/18* (2013.01); *B60W 2710/08* (2013.01); *B60W 2710/18* (2013.01); *B60W 2710/20* (2013.01); *Y02T 10/70* (2013.01); *Y02T 10/7072* (2013.01); *Y02T 90/12* (2013.01); *Y02T 90/14* (2013.01)

(58) Field of Classification Search
CPC ......... B60W 2540/10; B60W 2540/12; B60W 2540/18; B60W 2710/08; B60W 2710/18; B60W 2710/20; B60L 53/38; B62D 15/0285; Y02T 90/12; Y02T 90/14; Y02T 90/121; Y02T 90/122; Y02T 90/125; Y02T 10/7072; Y02T 10/7005
See application file for complete search history.

(56) References Cited

U.S. PATENT DOCUMENTS

| | | | |
|---|---|---|---|
| 2012/0095617 A1* | 4/2012 | Martin | G05D 1/028 701/1 |
| 2012/0323423 A1 | 12/2012 | Nakamura et al. | |
| 2014/0039728 A1 | 2/2014 | Imazu et al. | |
| 2014/0074352 A1 | 3/2014 | Tate, Jr. et al. | |
| 2015/0151641 A1 | 6/2015 | Berger et al. | |
| 2015/0175025 A1 | 6/2015 | Barbul et al. | |
| 2015/0231981 A1 | 8/2015 | Kees et al. | |
| 2015/0329110 A1* | 11/2015 | Stefan | B60Q 9/002 701/1 |
| 2015/0375740 A1* | 12/2015 | Okamura | B60W 30/146 701/25 |
| 2016/0046198 A1 | 2/2016 | Krammer | |
| 2017/0139415 A1* | 5/2017 | Stefan | G05D 1/0088 |

FOREIGN PATENT DOCUMENTS

| | | |
|---|---|---|
| DE | 10 2005 008 875 A1 | 9/2006 |
| DE | 10 2009 050 559 A1 | 4/2011 |
| DE | 10 2009 047 248 A1 | 6/2011 |
| DE | 10 2010 030 486 A1 | 12/2011 |
| DE | 10 2010 045 694 A1 | 3/2012 |
| DE | 10 2010 049 586 A1 | 4/2012 |
| DE | 10 2012 214 199 A1 | 4/2014 |
| DE | 10 2013 217 623 A1 | 4/2014 |
| DE | 10 2012 214 201 A1 | 5/2014 |
| DE | 10 2013 207 906 A1 | 10/2014 |
| DE | 10 2013 207 907 A1 | 10/2014 |
| DE | 10 2013 217 713 A1 | 3/2015 |
| DE | 10 2013 217 718 A1 | 3/2015 |
| DE | 10 2015 202 435 A1 | 8/2015 |
| EP | 2 700 530 A1 | 2/2014 |
| EP | 2 965 965 A1 | 1/2016 |
| GB | 2481535 A | 12/2011 |
| WO | WO 2004/065196 A1 | 8/2004 |

OTHER PUBLICATIONS

German-language Written Opinion (PCT/ISA/237)) issued in PCT Application No. PCT/EP2017/051555 dated Apr. 25, 2017 (six pages).

German-language Search Report issued in counterpart German Application No. 10 2016 202 460.4 dated Dec. 15, 2016 with partial English translation (11 pages).

Chinese-language Office Action issued in Chinese Application No. 201780005547.2 dated Mar. 31, 2020 with English translation (22 pages).

Chinese-language Office Action issued in Chinese Application No. 201780005547.2 dated Sep. 14, 2020 with English translation (15 pages).

German-language European Office Action issued in European Application No. 17701494.1 dated Jun. 2, 2021 (five (5) pages).

\* cited by examiner

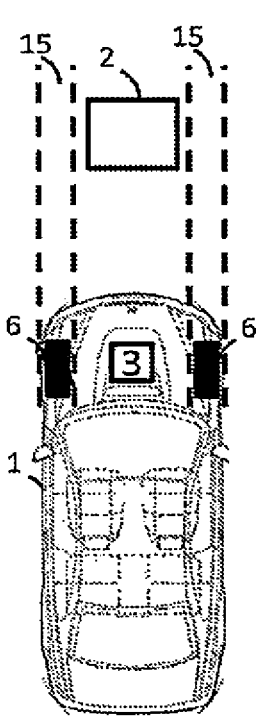
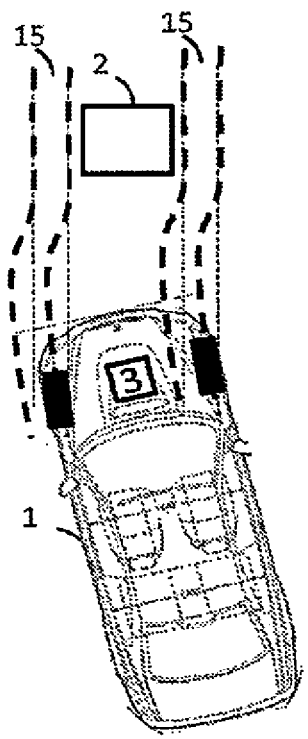
Fig. 9A     Fig. 9B
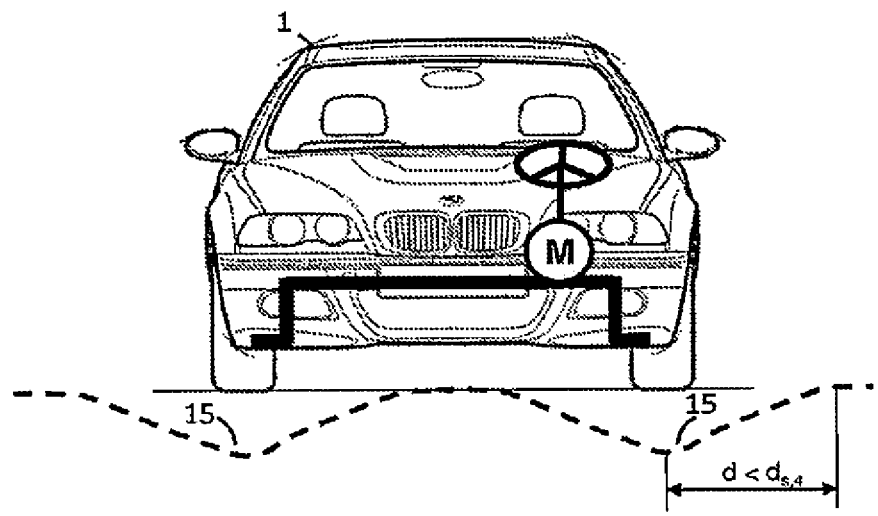
Fig. 10

ASSISTANCE SYSTEM AND METHOD FOR ASSISTING THE DRIVER OF A MOTOR VEHICLE WHEN POSITIONING THE MOTOR VEHICLE AT A PREDEFINED TARGET POSITION

CROSS REFERENCE TO RELATED APPLICATIONS

This application is a continuation of PCT International Application No. PCT/EP2017/051555, filed Jan. 25, 2017, which claims priority under 35 U.S.C. § 119 from German Patent Application No. 10 2016 202 460.4, filed Feb. 17, 2016, the entire disclosures of which are herein expressly incorporated by reference.

BACKGROUND AND SUMMARY OF THE INVENTION

The invention relates to an assistance system for assisting the driver of a motor vehicle when positioning the motor vehicle at a predefined target position.

It can be necessary to position a motor vehicle at a predefined target position. For example, systems for wireless, in particular inductive charging of electrically driven vehicles (for example, electric vehicles or hybrid vehicles) with electrical energy are known, in which the vehicle has to be positioned at a predefined target position (charging position), so that a wireless transfer of electrical energy can take place in this charging position. In one variant of an inductive charging system which is frequently found, a primary coil is arranged on the ground, while a secondary coil is arranged on the vehicle underbody. The energy transfer takes place via a magnetic coupling of primary coil and secondary coil. For efficient energy transfer, the vehicle has to be moved into a charging position in which the secondary coil on the vehicle is aligned as precisely as possible above the primary coil.

In known assistance systems for assisting the driver when positioning a motor vehicle at a predefined charging position, the relative position of the primary coil to the secondary coil is measured continuously during the positioning procedure via a suitable method and, based on this position information, driver information is output to the driver to assist the driver when positioning. For example, it can be visually displayed to the driver in the vehicle cockpit how the vehicle is located in relation to the ground coil and whether the target position has been reached with sufficient accuracy. Specific steering instructions can also be given to the driver. The positioning of the vehicle thus takes place manually by the driver, wherein the driver is assisted by corresponding driver information during the positioning. Examples of such assistance systems are described in documents DE 10 2013 207 907 A1, DE 10 2013 207 906 A1, and DE 10 2012 214 201 A1.

Furthermore, carrying out the positioning of the vehicle on the charging position automatically based on such position information is known, as described, for example, in documents DE 10 2015 202 435 A1, DE 10 2013 217 713 A1, and DE 10 2013 217 718 A1.

Ground contours can also be used for positioning a motor vehicle at a target position, which act on wheels of the motor vehicle, for example, a mechanical barrier arranged transversely to the travel direction (for example, a bar on the garage floor) and/or guide rails (for example, bars in the longitudinal direction or ruts). The above-described concepts for positioning the motor vehicle at a charging position have an array of disadvantages:

In the case of assisting the manual positioning by way of the output of driver information, the driver has to concentrate on the implementation of the output driver information (for example, an indicated position or direction display) in suitable actuating actions of accelerator pedal, brake pedal and/or steering wheel. If the vehicle does not have a creep mode, which is typically provided in vehicles having automatic transmission, in which the vehicle rolls slowly upon non-actuation of the accelerator and brake pedals, a frequent actuation change between accelerator and brake pedals is necessary for the manual longitudinal guiding. This is the case, for example, in many electric vehicles and additionally makes stopping at the correct position more difficult.

In the case of manual positioning, the accuracy with respect to reaching the predefined target position is very strongly dependent on the proficiencies and also on the present performance capacity of the driver; the accuracy is generally less than in the case of an assistance system having automatic positioning. The positioning accuracy has a large influence on the charging efficiency. A low positioning accuracy can be compensated for at least partially by a correspondingly complex design of the components of the charging system.

Completely automatic positioning having automatic longitudinal and transverse guiding generally already requires a position measurement at a large distance (for example, 5 m) from the charging position, so that the vehicle has the possibility of ascertaining a suitable travel trajectory to reach the target position sufficiently early. To safeguard from malfunctions during the automatic driving operation, suitable complex safety functions have to be provided.

Furthermore, an explicit transfer of the driving duty from the driver to the assistance system generally always takes place before the automatic positioning. This transfer is typically less convenient and requires the attention of the driver.

The above-mentioned mechanical ground contours represent tripping hazards for pedestrians. Moreover, the ground contours generally have the disadvantage that they have to be arranged in accordance with the vehicle geometry (in particular in consideration of the position of the wheels in relation to the secondary coil). Another vehicle type is thus frequently precluded from being able to be charged at the same charging station without adaptation of the ground contours.

A parking assistance system for providing a guide when parking is known from document DE 10 2013 217 623 A1, in which the accelerator pedal and the brake pedal are calibrated, in order to guide a driver into a parking space. In particular, the accelerator pedal can be modulated or controlled to reduce the throttle valve position when the vehicle approaches the parking space (for example, to simulate a perception in which a driver feels as if the vehicle is arranged on an inclined or sloping surface and presses or guides the vehicle into the parking space).

In addition, document DE 10 2005 008 875 A1 describes a method for assisting a vehicle driver when driving to a target position, in which it is communicated to the vehicle driver by haptic feedback whether he is moving along a previously ascertained setpoint trajectory to reach the target position from the present vehicle position. In this case, it is signaled via variable auxiliary forces on the steering wheel whether the vehicle is moving along the setpoint trajectory, by the forces to be applied by the vehicle driver to actuate the steering wheel becoming increasingly greater the farther the vehicle moves away from the setpoint trajectory, and by the forces to be applied by the vehicle driver to actuate the steering wheel becoming increasingly less the farther the vehicle moves toward the setpoint trajectory.

It is an object of the invention to specify an alternative assistance system and a corresponding method for assisting the driver when positioning the motor vehicle at a predefined target position, which reduce or even avoid the above-described disadvantages.

The object is achieved by the features of the independent patent claims. Advantageous embodiments are described in the dependent claims. It is to be noted that additional features of a patent claim dependent on an independent patent claim, without the features of the independent patent claim or only in combination with a subset of the features of the independent patent claim, can form a separate invention independent of the combination of all features of the independent patent claim, which can be made the subject matter of an independent claim, a divisional application, or a subsequent application. This applies similarly to technical teaching described in the description, which can form an invention independent of the features of the independent patent claims.

A first aspect of the invention relates to an assistance system for assisting the driver of a motor vehicle when positioning the motor vehicle at a predefined target position. The target position is preferably a charging position for wireless charging, in particular inductive charging, of the motor vehicle. To position the motor vehicle, the longitudinal movement of the vehicle is manually controllable via one or more operating elements actuatable by the driver (for example, accelerator pedal, brake pedal). The assistance system assists the manual longitudinal control during the positioning. For this purpose, the assistance system is configured to repeatedly determine position information with respect to the relative position of the vehicle in relation to the target position during the positioning. It is thus established how vehicle and target position are located in relation to one another. For example, proceeding from a vehicle reference point (for example, middle of the rear axis), the distance x to the target position is determined in the direction of the vehicle longitudinal axis.

The assistance system is configured to influence the manual longitudinal control, i.e., the resulting vehicle longitudinal movement in reaction to the manual driver specification is influenced by the assistance system. By way of the influencing of the manual longitudinal control, the vehicle longitudinal movement is counteracted on the part of the assistance system at least for certain relative positions as a function of the respective position information, whereby the vehicle is decelerated or at least the acceleration is reduced, in order to bring the vehicle to a stop essentially at the target position.

For example, the accelerator pedal characteristic curve, which specifies the relationship between accelerator pedal position and resulting driver command torque, can be influenced on the part of the assistance system, and therefore with identical accelerator pedal position, a significantly lower driver command torque, in particular even a decelerating driver command torque, results than without influencing.

Alternatively, to influence the manual longitudinal control in the drive control unit, the driver command torque can be reduced by a torque dependent on the relative position, wherein the longitudinal guiding of the vehicle takes place as a function of the resulting reduced torque.

Furthermore, a braking torque can be set automatically via the service brake as a function of the respective position information, which counteracts the drive torque specified via the accelerator pedal.

It is also conceivable that a braking torque increased in relation to the braking torque induced by actuating the brake pedal is set as a function of the position information, to bring the vehicle to a stop at the target position.

By way of the position-dependent influencing of the manual longitudinal control according to the invention, it is made possible for the driver to bring the vehicle to a stop essentially at the target position without a high level of accuracy in the operation of the operating elements (typically accelerator pedal and brake pedal). Non-optimal manual longitudinal guiding is at least partially corrected by the assistance system.

It is to be noted that the influencing of the manual longitudinal control is not restricted to a counteraction against the vehicle movement: The influencing of the manual longitudinal control preferably also acts for certain relative positions in the direction of the vehicle movement, and therefore the vehicle in this way experiences an additional acceleration, for example, if the vehicle would already come to a standstill before the target position without influencing the manual longitudinal control.

The assistance system according to the invention is thus an assistance system engaging in the vehicle longitudinal guiding, which assists the driver in reaching the target position. The assistance system is preferably designed such that the driver always remains in the active role and is solely corrected by the assistance system. The driver can be intuitively guided to the correct position, for example, via an additional force acting additionally on the vehicle longitudinal movement, which is initiated via a provided actuator (for example, a drive motor or a vehicle brake).

A virtual (i.e., nonexistent) ground contour is preferably simulated by the influencing of the manual longitudinal control performed on the part of the assistance system. The ground contour acts on one or more wheels of a vehicle axle (for example, the front axle) and represents an obstruction at least at certain positions, which prevents or at least obstructs the further movement.

The impression of a ground contour acting as an obstruction, by which the vehicle is brought to a stop at the correct position, is thus created in the driver by the influencing of the manual longitudinal control.

The ground contour is, for example, a virtual barrier arranged essentially transversely to the vehicle movement or a virtual trough located essentially transversely to the vehicle movement, which assists the stopping at the target position.

The driver knows such ground contours as everyday driving situations. The driver will therefore intuitively react correctly, and therefore the vehicle will come to a stop at the correct position at least in the longitudinal direction.

The characteristic of the influencing of the manual longitudinal guiding, in particular the characteristic of an above-described simulated virtual ground contour, can be adapted dynamically to the present driving situation. The characteristic is dependent, for example, on the vehicle velocity and/or the travel direction. If the vehicle moves, for example, excessively rapidly toward the target position, the vehicle is automatically decelerated by the assistance system before the target position, for example. For this purpose, for example, a ramp having a positive slope with a small trough located at the top can be simulated. In contrast, if the vehicle moves excessively slowly toward the target position, the vehicle is preferably automatically accelerated by the assistance system before the target position. For this purpose, for example, a ramp having a negative slope with a trough located at the bottom can be simulated. The absolute value of the slope of the ramp and the depth of the trough can be dependent on the driving situation, in particular the vehicle velocity.

The assistance system can be configured such that for the case in which the vehicle movement will end after the target position in the travel direction of the engaged driving gear (for example, driving gear D or driving gear R), rolling opposite to the travel direction of the engaged driving gear in the direction of the target position is caused, wherein the vehicle preferably comes to a standstill in the target position. The vehicle thus then rolls automatically back to the target position. Additionally or alternatively, the assistance system is configured such that upon ending the vehicle movement in the travel direction of the engaged driving gear before the target position, the vehicle automatically causes rolling in the travel direction of the engaged driving gear toward the target position, wherein the vehicle preferably comes to a standstill in the target position.

The vehicle can thus preferably additionally execute a movement after the stopping, for example, rolling back into the lowest point of a simulated trough, if the driver has driven too far, or can roll further to this point of the simulated trough.

The assistance system is preferably configured to influence the manual longitudinal control of the vehicle such that in addition to the torque specified by the driver via the one or more operating elements to accelerate or decelerate the vehicle a torque acting opposite to the travel direction of the engaged driving gear is generated to decelerate the vehicle as a function of the position information, which assists the driver during positioning.

Furthermore, an additional torque acting in the travel direction of the engaged driving gear can optionally be generated to accelerate the vehicle as a function of the respective relative position. For example, in addition to the acceleration or deceleration selected by the driver via accelerator or brake pedal, a torque in or opposite to the travel direction can thus be applied, in particular via an electrical drive machine. This torque is preferably sufficiently small that it can be overridden at any time by the driver.

The motor vehicle preferably comprises an electrical machine for the longitudinal movement of the vehicle; additional torque is generated in this case via the electrical machine. In this case, the accelerating or decelerating torque specified by the driver via the operating elements is preferably also generated via the same electrical machine. However, it could be that the torque specified by the driver via the operating elements is generated via other actuators, for example, via another electrical machine or an internal combustion engine (for acceleration) in conjunction with a service brake (for deceleration).

A positive (i.e., accelerating) or negative (i.e., decelerating) torque can preferably be applied alternatively in both travel directions (forward and reverse) via the electrical machine. Electrical machines frequently have the advantage that, in contrast to internal combustion engines, they are already operable in both directions without a transmission and can generate sufficient torques even at a very low speed.

A specification for an additional torque which decelerates or accelerates the vehicle is preferably determined as a function of the respective position information, from which additional torque the above-described torque results. For example, a torque is read out from a memory as a function of the present position information.

Furthermore, a torque desired by the driver is determined as a function of the accelerator pedal position of an accelerator pedal.

The torque desired by the driver and the specification for the additional torque are superimposed and a superimposed torque is thus determined. The longitudinal guiding of the vehicle then takes place as a function of the superimposed torque. For example, an electrical machine is activated as a function of the superimposed torque to accelerate or decelerate the vehicle depending on the sign of the superimposed torque. It can also be that a service brake is activated as a function of the superimposed torque, for example, if the superimposed torque has a negative sign.

The above-described assistance during the positioning is preferably first activated in close range to the target position. For this purpose, a distance measure (for example, the Euclidean distance in the two dimensions of the top view or the distance in the vehicle longitudinal direction) to the target position (for example, the middle of the primary coil) is determined repeatedly. The starting point of the distance measure is, for example, the middle of the secondary coil.

It is continuously checked whether the distance measure is less than or equal to a first threshold value for the distance measure. The first threshold value is, for example, in the range of 0.2 m to 4.0 m, preferably in the range of 0.5 m to 2.0 m, and corresponds, for example, to approximately 1 m. The first threshold value for activating the assistance can be dependent on the driving situation and can be dependent on velocity and/or travel direction, for example.

An assistance during the positioning is first activated if the distance measure is less than or equal to the threshold value. The activation of the assistance can be dependent on the driver confirming an activation proposed by the system, for example, by actuating an operating element in the vehicle cockpit, for example, by pressing a multifunctional push/turn control knob in the central console.

If the distance measure becomes excessively large again after activation of the assistance, for example greater than or equal to a second threshold value, the assistance is deactivated again. The first threshold value is preferably less in the sense of a hysteresis than the second threshold value. The first threshold value and the second threshold value can also be identical, however.

As a supplement to the assistance in the manual longitudinal control, in addition, an additional steering torque (to the left or right) can be applied by an actuator via an electrical steering assistance system, for example, to assist the manual transverse control.

For this purpose, a setpoint trajectory for reaching the target position is determined. The setpoint trajectory is preferably continuously updated during the approach to the target position.

During the driving to the target position, a measure for the deviation from the setpoint trajectory is determined repeatedly on the part of the assistance system. The manual transverse control of the vehicle is then influenced by an additional steering torque as a function of the amount of the deviation.

The additional steering torque is preferably sufficiently small that the driver can override it at any time.

For example, ruts guided along the setpoint trajectory, which assist the travel along the setpoint trajectory as optimally as possible, can be simulated to influence the manual transverse control by the additional steering torque.

The ruts can be static with respect to the location thereof during the positioning or alternatively can be dynamically adapted in the location thereof upon deviation from the setpoint trajectory (for example, if the deviation exceeds a determined amount).

A second aspect of the invention relates to a method for assisting the driver of a motor vehicle when positioning the motor vehicle at a predefined target position. According to the method, position information with respect to the relative position of the vehicle in relation to the target position is determined repeatedly during the positioning. The manual longitudinal control of the vehicle is influenced by an influence counteracting the vehicle movement at least for certain relative positions as a function of the respective position information, with the goal that the vehicle comes to a stop essentially at the target position.

The above statements on the assistance system according to the invention according to the first aspect of the invention also apply correspondingly to the method according to the invention according to the second aspect of the invention. Advantageous exemplary embodiments of the method according to the invention which are not explicitly described at this point or in the patent claims correspond to the advantageous exemplary embodiments of the assistance system described above or in the patent claims.

The invention will be described hereafter on the basis of an exemplary embodiment with the aid of the appended drawings.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 9A and 9B shows exemplary virtual ruts in the top view.

FIG. 10 shows exemplary virtual ruts in cross section.

DETAILED DESCRIPTION OF THE DRAWINGS

Figure 1A:
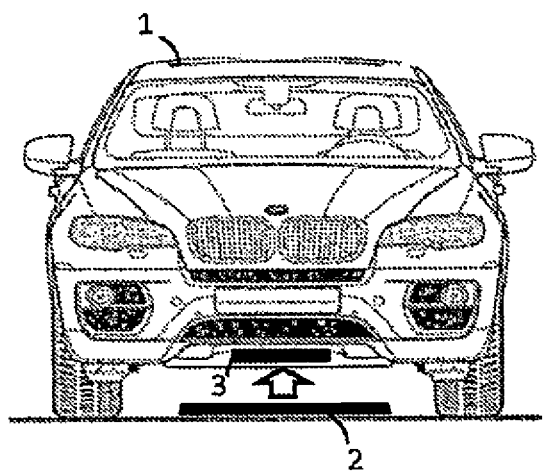
FIGS. 1A and 1B shows an exemplary inductive charging system.
Figure 1B:
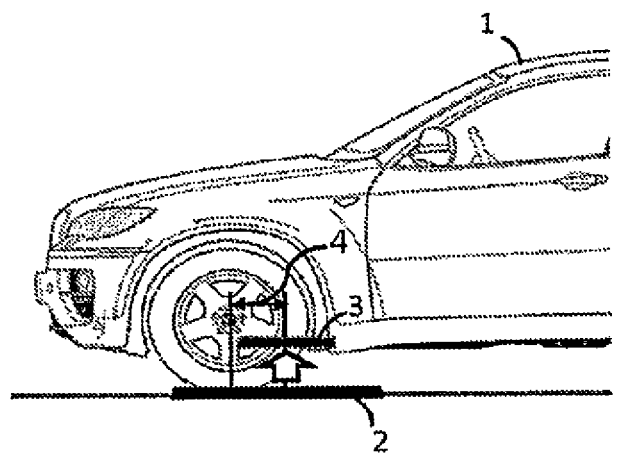

FIGS. 1A and 1B show a conventional inductive charging system for charging a motor vehicle 1, which comprises a primary coil 2, which is arranged on the ground, and a secondary coil 3, which is integrated onto the vehicle underbody. The primary coil 2 and the secondary coil 3 are aligned one over another in FIGS. 1A and 1B; the vehicle is located in the charging position. FIG. 1A shows the front view of the vehicle 1, and the FIG. 1B shows the side view of the vehicle 1. The transfer of the electrical energy takes place via a magnetic coupling of the primary coil 2 to the secondary coil 3. The two coils 2, 3 are only loosely coupled because of the generally relatively large air gap.

In FIG. 1B, the front axle is in the ideal position, and the reference sign 4 marks the distance between the front axle and the middle of the secondary coil 3.

According to the invention, the manual longitudinal control is influenced to assist the driver when positioning the vehicle at the charging position. In the exemplary embodiments described hereafter, the influencing of the manual longitudinal control is oriented to natural conditions, for example the influencing of the manual longitudinal control corresponds to a virtual ground contour.

Figure 2:
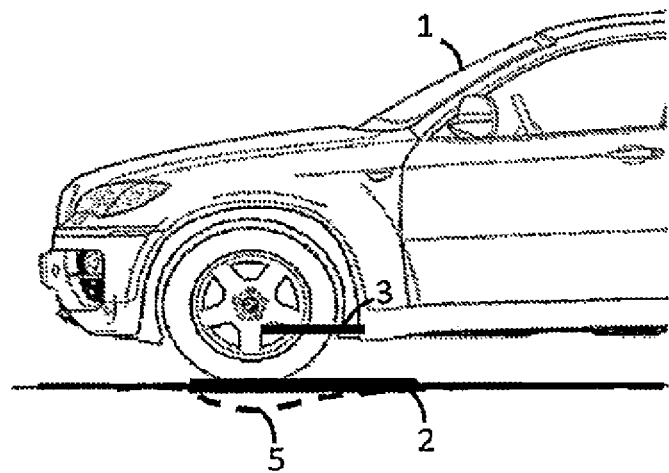
FIG. 2 shows an exemplary virtual ground contour in the form of a virtual trough located essentially transversely to the vehicle longitudinal direction.

FIG. 2 shows a virtual ground contour 5 in the form of a virtual trough located essentially transversely to the vehicle longitudinal direction. The horizontal line corresponds to the actual contour of the ground. The virtual trough 5 is placed such that the lowest point of the trough essentially corresponds to the ideal charging position. The influencing of the manual longitudinal control on the part of the assistance system essentially corresponds to the influence of an actual trough on the vehicle, which has the contour curve shown in FIG. 2.

Figure 3:
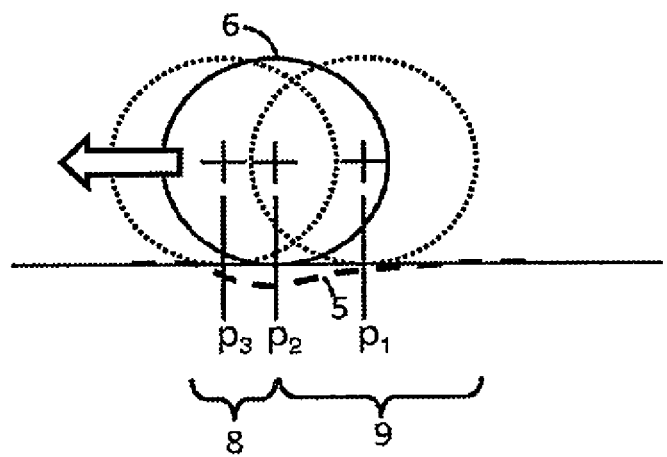
FIG. 3 shows the virtual trough with the front wheel in three different exemplary vehicle relative positions.

FIG. 3 shows the virtual trough 5 with the front wheel 6 in three different vehicle relative positions. It is presumed that the vehicle 1 approaches the charging position in the forward direction from right to left corresponding to the arrow direction. The front wheel 6 shown by solid lines corresponds to the position $p_2$ of the front wheel upon reaching the charging position; the wheel shown by dashed lines corresponds to the position $p_1$, $p_3$ of the same front wheel before reaching the charging position or after overshooting the charging position, respectively. The manual longitudinal control of the vehicle is preferably influenced such that the wheel 6 comes to a stop at the illustrated ideal position $p_2$.

The slope of the illustrated virtual ground contour 5 at a position $p_i$ corresponds to an additional positive or negative force, depending on the sign of the slope, on the vehicle 1 at the respective vehicle relative position $p_i$, which is induced by the influencing of the manual longitudinal control. The greater the absolute value of the slope, the greater the absolute value of the respective additionally acting force. The additional force corresponds to the derivative of the illustrated ground contour (upon observation of the ground contour 5 as a function, the independent position variable of which increases from left to right in FIG. 3).

A negative slope (upon observation from left to right) in the region 8 corresponds to an additional force acting opposite to the travel direction (i.e., an additional applied torque acting opposite to the travel direction), i.e., at the position $p_3$, the vehicle is decelerated by the additional force opposite to the travel direction.

A positive slope (upon observation from left to right) in the region 9 corresponds to an additional force acting in the travel direction (i.e., an additional applied torque acting in the travel direction), i.e., at the position $p_1$, the vehicle is accelerated by the additional force.

When the front wheel 6 reaches the ideal position $p_2$, no additional torque is preferably applied (the derivative is zero at this point).

In the travel direction before the target position, a virtual ramp can be provided as part of the ground contour 5, to decelerate or additionally accelerate the vehicle.

Figure 4A:
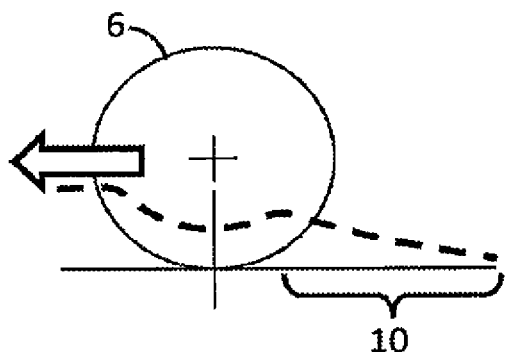
FIGS. 4A and 4B shows an exemplary virtual trough having additional velocity-dependent ramp.
Figure 4B:
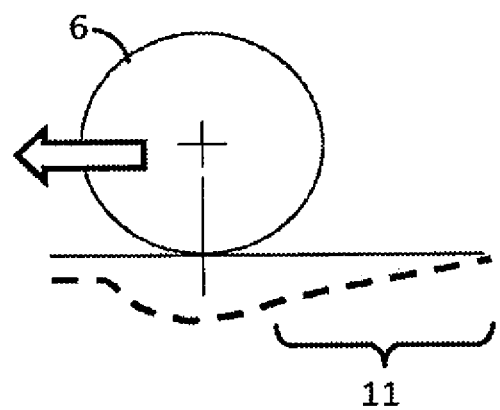

The positive or negative forces additionally applied depending on relative position $p_i$ and therefore also the virtual ground contour 5 are preferably dynamically adapted to the situation, in particular to the present vehicle velocity. For example, a virtual ramp is provided as part of the ground contour 5 before reaching the target position. The sign of the slope of the ramp is dependent on the travel velocity. In the case shown in FIG. 4A, the vehicle velocity is excessively high, and the vehicle 2 is braked by a decelerating torque in the region 10 of the rising ramp, so that the vehicle 2 does not overshoot the target position. In the case shown in FIG. 4B, the vehicle velocity is excessively low. The vehicle is accelerated by an accelerating torque in the region 11 of the falling ramp, so that the vehicle 2 can reach the target position 2.

In the case of a virtual trough, an additional torque acting in the direction of the engaged driving gear is applied before the target position, which accelerates the vehicle, and an additional torque acting opposite to the direction of the engaged driving gear is applied after the target position, which decelerates the vehicle.

Figure 5:
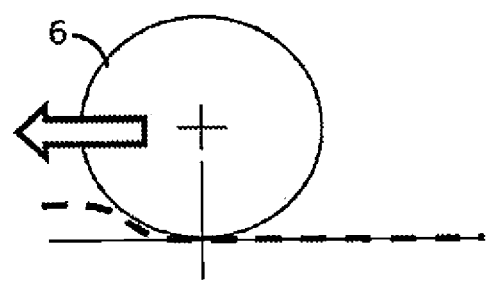
FIG. 5 shows an exemplary simple virtual barrier.

Instead of a virtual trough, a curve for the additional torque can also be provided which corresponds to a simple virtual barrier, in which, in contrast to the virtual trough, no additional torque acting in the direction of the engaged driving gear is applied before the target position to accelerate the vehicle in the direction of the target position. An example of such a simple virtual barrier is shown in FIG. 5.

Figure 6:
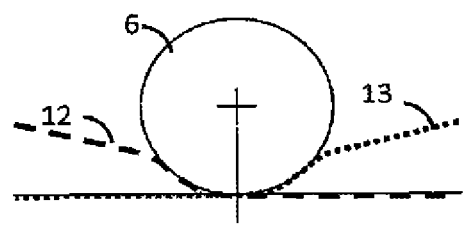
FIG. 6 shows an exemplary virtual ground contour dependent on the vehicle direction.

Furthermore, it is conceivable that the curve for the additional torque and thus the curve of the virtual ground contour is dependent on which travel direction was selected on the basis of the engaged driving gear. For example, a curve 12 shown by dashed lines in FIG. 6 results for the virtual contour if a driving gear (for example D driving gear) is engaged for the forward direction and the wheel 6 approaches the ground contour 6 from right to left, and a curve 13 shown by dotted lines results for the virtual ground contour if a driving gear (for example, R driving gear) is engaged for the reverse direction and the wheel 6 approaches the ground contour 6 from left to right.

Figure 7:
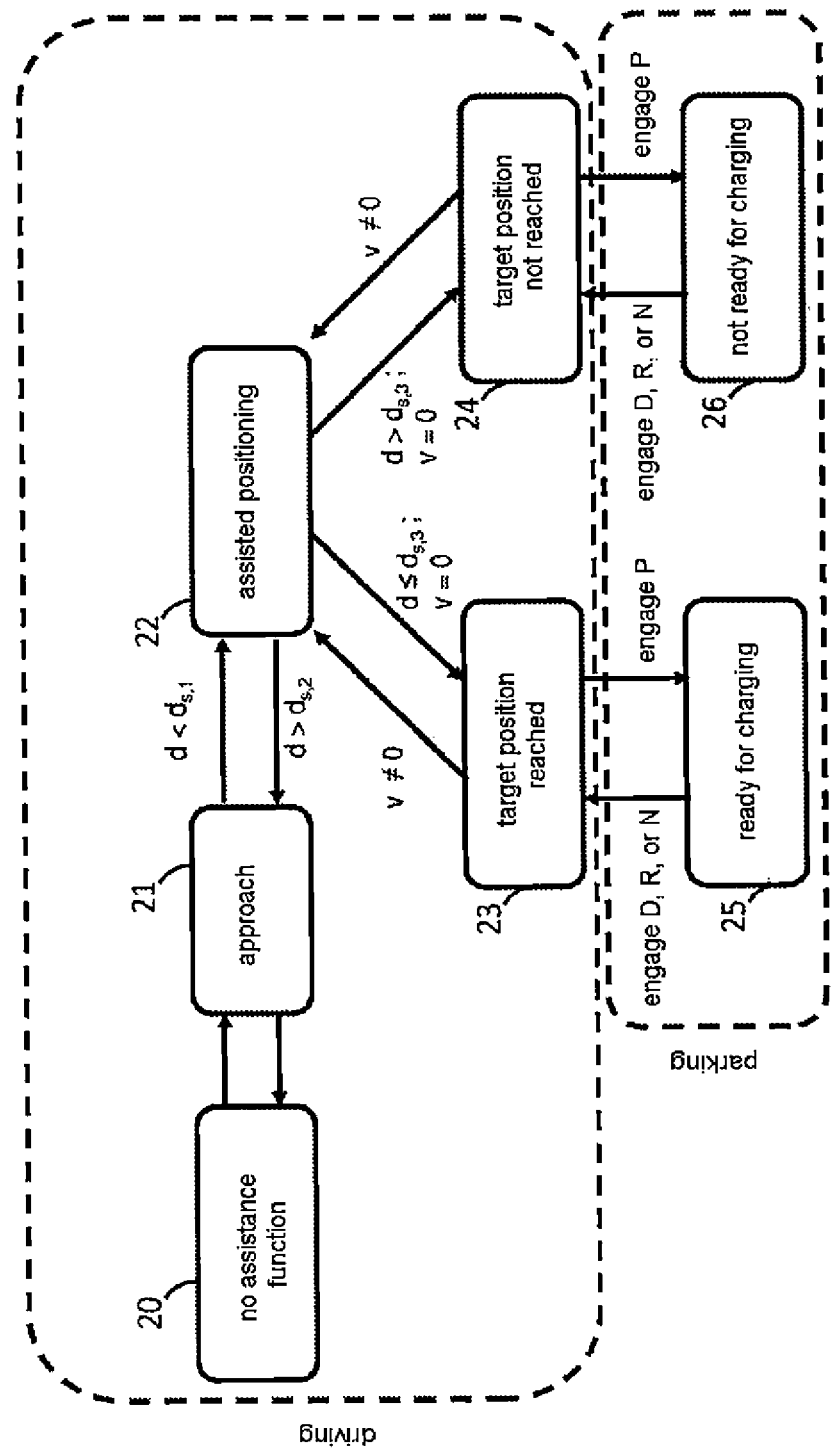
FIG. 7 shows an exemplary state diagram of the assistance system.

FIG. 7 shows an exemplary state diagram for an exemplary embodiment of the assistance system according to the invention, which shows various system states of the assistance system and the state transitions between the individual system states. The system states are divided into the driving states 20-24 and the parking states 25, 26.

In the system state 20, no assistance of the driver by influencing the manual longitudinal control is active, because the vehicle is still excessively remote from the charging position.

A radio unit, which can wake up the vehicle-side assistance system via a radio signal, is located approximately at the target position. If the distance d between the vehicle and the charging position decreases (for example, d<20 m), the radio signal is received at the vehicle and the assistance system is awakened via the radio signal, and therefore the assistance system changes into a state 21. In this state 21, the distance d to the target position is determined continuously (for example, by triangulation of the received radio signal) and it is checked whether the distance d is less than a threshold value $d_{s,1}$ (e.g., $d_{s,1}$=1 m). It is additionally conceivable that in the state 21 (and also in the state 22), the assistance system outputs visual or acoustic driver information to the driver, to assist him when positioning, for example as a visual display on a display screen or a heads-up display.

If the distance d to the target position becomes less than the threshold value $d_{s,1}$, the assistance system changes into the state 22, in which positioning can be assisted by engagement in the longitudinal control, as has been described above. If the distance d becomes greater than the threshold value $d_{s,2}$ again (with $d_{s,2}>d_{s,1}$), the system changes from the state 22 back into the state 21.

In the state 22 of the assisted positioning, the distance d to the target position is continuously updated and it is checked whether both the distance d is already less than or equal to a threshold value $d_{s,3}$ and also the vehicle velocity v is already essentially zero. If both are the case, the system changes into the state 23: the target position is reached.

It can optionally be provided that if the driver changes his setpoint specification with respect to acceleration and/or braking of the vehicle in the state 22 (for example, stronger braking or giving gas), a characteristic curve based on the virtual ground contour, which is used for the assisted positioning, is adapted to the changed situation. The vehicle reaches the target position in spite of variable driver command, as long as this change is not sufficiently strong that the state 22 is left in the direction of state 24 or 21.

In contrast, if the velocity v is essentially zero, while the distance d is still greater than the threshold value $d_{s,3}$, the system changes into the state 24, in which the target position is not yet reached. The state 24 can be achieved, for example, in that the driver causes strong braking of the vehicle by actuating the brake pedal, and therefore prevents the target position from being reached in spite of assistance in the positioning.

The system changes from the state 23 (target position reached) or the state 24 (target position not yet reached) back into the state 22 (assisted positioning) if the velocity v is not equal to zero, for example by actuating the accelerator pedal or releasing the brake pedal (if a creep torque is provided).

If the state 23 has been assumed and the target position was reached, the driver can transfer the vehicle 1 into the state 25 by engaging the driving gear P, in which the vehicle 1 is ready for charging and the charging procedure can be started, for example, on the part of the driver or automatically. Checks typically take place before the start of the charging procedure. In addition to the position check, these comprise air gap monitoring and the checking of the charging readiness of the electrical vehicle energy accumulator. This check is assisted by wireless communication between vehicle and charging infrastructure. If all preconditions are fulfilled, the charging procedure is started. This is generally indicated to the driver even before leaving the vehicle.

If the state 24 has been assumed and the target position has thus just not been reached, the driver can transfer the vehicle 1 into the state 26 by engaging the driving gear P, in which the vehicle 1 is not ready for charging.

By engaging the driving gears D, R, or N in the state 25 or 26, the vehicle can be transferred back into the state 23 or 24, respectively.

It is advantageous if the respectively provided state is indicated to the driver by visual and/or acoustic signals.

Figure 8:
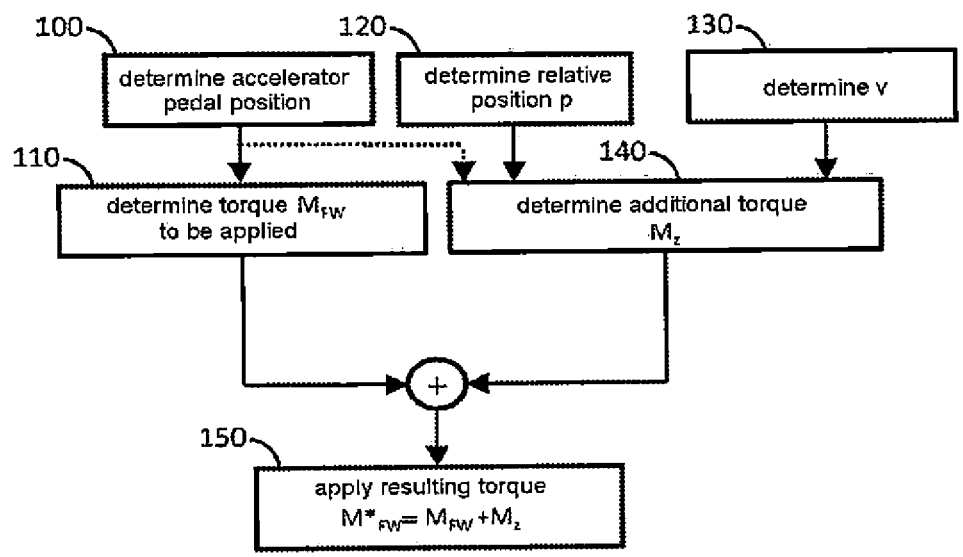
FIG. 8 shows an exemplary sequence for influencing the manual longitudinal control.

FIG. 8 shows an exemplary embodiment for influencing the longitudinal control in the scope of the assisted positioning in the state 22. The accelerator pedal position specified manually by the driver is continuously determined in step 100 and a torque $M_{FW}$ to be applied is determined therefrom in step 110. The torque to be applied would be applied without further influence of the longitudinal control, for example, via an electrical drive machine.

To influence the longitudinal control, in the state 22 in step 120, the present relative position p of the vehicle 1 in relation to the target position is determined continuously. For example, to determine the relative position p=(x, y, φ), the distance x to the target position in the direction of the vehicle longitudinal axis, the distance y to the target position orthogonal to the direction of the vehicle longitudinal axis, and the angle-related pivot of the primary and secondary coils in relation to one another are determined. The reference point of the relative position is, for example, the middle of the front axle, the middle of the secondary coil, the middle of the rear axle, or an arbitrary other reference point on the vehicle. Furthermore, the present vehicle velocity v is determined continuously in step 130.

As a function of the present relative position p and the present vehicle velocity v, an additional torque $M_Z$ is determined continuously in step 140, by which the torque $M_{FW}$ to be applied is to be changed so that the vehicle comes to a stop essentially at the target position. In a simple case, to determine the additional torque $M_Z$, the distance x to the target position in the direction of the vehicle longitudinal axis is solely used from the information p.

The additional torque $M_Z$ is, for example, stored in a characteristic curve or a characteristic map as a function of the present relative position (in particular only of x) and optionally as a function of the vehicle velocity v. Furthermore, further parameters can be taken into consideration to determine the additional torque $M_Z$, for example, the travel direction. The additional torque $M_Z$ is optionally also dependent on the accelerator pedal position (see the dashed arrow in FIG. 8), the torque $M_{FW}$ specified by the driver, or another variable characteristic of the accelerator pedal actuation. In this way, the torque $M_{FW}$ specified by the driver via the accelerator pedal can be taken into consideration in order to determine the required additional torque $M_Z$. It would be possible, for example, that the target position would be reached accurately with the present accelerator pedal position. In the same manner, a variable characteristic of the brake pedal actuation of the driver can optionally also be taken into consideration in the determination of the additional torque $M_Z$. The characteristic curve or the characteristic map can be adapted to the present situation, for example, as a function of a variable characteristic of the actuation of the accelerator pedal or brake pedal.

A characteristic curve for the additional torque $M_Z$ can be adapted, for example, as a function of a variable characteristic of the accelerator pedal position, a variable characteristic of the brake pedal position, and/or the vehicle velocity v.

The characteristic curve or the characteristic map results, for example, by derivation of the ground contours shown in FIGS. 3-6.

If the additional torque is to have a decelerating effect, the additional torque $M_Z$ is negative; if the additional torque is to have an accelerating effect, the additional torque $M_Z$ is positive. If no influence of the manual longitudinal control is to take place, the additional torque $M_Z$ is equal to zero.

The torque $M_{FW}$ to be set according to the driver command and the additional torque $M_Z$ are added and the resulting torque $M^*_{FW}=M_{FW}+M_Z$ is applied, for example, via an electrical machine.

It would also be conceivable to apply the additional torque $M_Z$ via an additional actuator (for example, a separate electrical machine or the service brake), independently of the drive torque $M_{FW}$. If the additional torque is solely a decelerating torque, it can be applied, for example, via the service brake.

In addition to influencing the manual longitudinal control, the manual transverse control of the vehicle 1 can also be influenced on the part of the assistance system by an additional steering torque when positioning. For example, the influencing of the manual transverse control can also be oriented to natural conditions: Virtual longitudinal ruts are preferably simulated to influence the manual transverse control.

To influence the manual transverse control, a setpoint trajectory is determined, to which the vertical longitudinal ruts are aligned.

In FIGS. 9A and 9B, exemplary virtual ruts 15 of the vehicle are shown in a top view, in FIG. 9A in the case of linear approach to the primary coil 2, in FIG. 9B in the case of diagonal approach to the primary coil. An exemplary cross section through the simulated longitudinal ruts 15 and also a steering linkage and an electric motor M for steering assistance are shown in FIG. 10.

To determine an additional steering torque applied via the electric motor, a measure is determined for the deviation from the setpoint trajectory, in particular a transverse deviation. The transverse control of the vehicle can be influenced by an additional steering torque as a function of this deviation measure. If the vehicle is driven out of the setpoint trajectory, for example, and therefore the transverse deviation increases, the steering force to be applied on the part of the driver increases as when driving over longitudinal ruts. As shown in FIG. 10, a steering torque superimposed on the driver command results from the cross section of the contour, which is, for example, proportional to the derivative of the rut cross section 15. The range $d_{s,4}$ (i.e., in FIG. 10, half of the width of the rut) of this torque in relation to the transverse deviation results from the reasonable range which permits reaching the target position. In particular, this range $d_{s,4}$ can be dependent on the longitudinal distance from the target position and can decrease with decreasing longitudinal distance, for example, since the possible correction range is greater at greater distance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assisting a driver of a motor vehicle when positioning the motor vehicle at a predefined target position, wherein to position the motor vehicle, longitudinal movement of the motor vehicle is manually controllable via one or more operating elements actuatable by the driver, the method comprising:

during positioning of the motor vehicle, repeatedly determining position information with respect to a relative position of the motor vehicle in relation to the predefined target position;

simulating a virtual ground contour acting on one or more wheels of a vehicle axle of the motor vehicle during the positioning; and influencing manual longitudinal control of the motor vehicle during the positioning of the motor vehicle by influencing longitudinal movement of the motor vehicle at least for certain relative positions, as a function of the position information and the virtual ground contour, such that the motor vehicle comes to a stop at the predefined target position;

wherein in a case of ending movement of the motor vehicle in the travel direction of an engaged driving gear after the predefined target position is reached, the motor vehicle is controlled to roll opposite to the travel direction of the engaged driving gear toward the predefined target position, or in a case of ending the movement of the motor vehicle in the travel direction of the engaged driving gear before the predefined target position is reached, the motor vehicle is controlled to roll in the travel direction of the engaged driving gear toward the predefined target position.

2. The method as claimed in claim 1, wherein a characteristic of the influence on the manual longitudinal control of the simulated virtual ground contour is dependent on a present driving situation including at least one of a vehicle velocity and a travel direction.

3. The method as claimed in claim 2, wherein the influence on the manual longitudinal control is implemented such that, depending on the vehicle velocity, the motor vehicle is accelerated or decelerated before reaching the predefined target position.

4. The method as claimed in claim 1, further comprising:
   determining a specification for an additional torque which decelerates or accelerates the motor vehicle as a function of respective position information; and
   superimposing a torque determined as a function of an accelerator pedal position of an accelerator pedal and the specification for the additional torque and determining a superimposed torque, wherein the longitudinal control of the motor vehicle takes place as a function of the superimposed torque.

5. A method for assisting a driver of a motor vehicle when positioning the motor vehicle at a predefined target position, wherein to position the motor vehicle, longitudinal movement of the motor vehicle is manually controllable via one or more operating elements actuatable by the driver, the method comprising:
   during positioning of the motor vehicle, repeatedly determining position information with respect to a relative position of the motor vehicle in relation to the predefined target position;
   simulating a virtual ground contour acting on one or more wheels of a vehicle axle of the motor vehicle during the positioning; and
   influencing manual longitudinal control of the motor vehicle during the positioning of the motor vehicle by influencing longitudinal movement of the motor vehicle at least for certain relative positions, as a function of the position information and the virtual ground contour, such that the motor vehicle comes to a stop at the predefined target position;
   wherein in a case of ending movement of the motor vehicle in the travel direction of an engaged driving gear after the predefined target position is reached, the motor vehicle is controlled to roll opposite to the travel direction of the engaged driving gear toward the predefined target position, and in a case of ending the movement of the motor vehicle in the travel direction of the engaged driving gear before the predefined target position is reached, the motor vehicle is controlled to roll in the travel direction of the engaged driving gear toward the predefined target position.

6. A method for assisting a driver of a motor vehicle when positioning the motor vehicle at a predefined target position, wherein to position the motor vehicle, longitudinal movement of the motor vehicle is manually controllable via one or more operating elements actuatable by the driver, the method comprising:
   during positioning of the motor vehicle, repeatedly determining position information with respect to a relative position of the motor vehicle in relation to the predefined target position;
   simulating a virtual ground contour as a ramp acting on one or more wheels of a vehicle axle of the motor vehicle during the positioning; and
   influencing manual longitudinal control of the motor vehicle during the positioning of the motor vehicle by influencing longitudinal movement of the motor vehicle at least for certain relative positions, as a function of the position information and the virtual ground contour, such that the motor vehicle comes to a stop at the predefined target position;
   wherein a slope of the ramp depends on the speed of the motor vehicle.

\* \* \* \* \*